(12) United States Patent
Kamiya et al.

(10) Patent No.: US 8,276,370 B2
(45) Date of Patent: Oct. 2, 2012

(54) CONSTRUCTION MACHINE

(75) Inventors: Shohei Kamiya, Tsuchiura (JP); Kazunori Nakamura, Tsuchiura (JP); Yasushi Arai, Tsuchiura (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 311 days.

(21) Appl. No.: 12/600,086

(22) PCT Filed: May 28, 2008

(86) PCT No.: PCT/JP2008/059781
§ 371 (c)(1),
(2), (4) Date: Nov. 13, 2009

(87) PCT Pub. No.: WO2008/149739
PCT Pub. Date: Dec. 11, 2008

(65) Prior Publication Data
US 2010/0212297 A1  Aug. 26, 2010

(30) Foreign Application Priority Data
May 31, 2007 (JP) .................. 2007-145370

(51) Int. Cl.
F01N 3/20 (2006.01)
(52) U.S. Cl. ................. 60/286; 60/295; 60/301; 60/303
(58) Field of Classification Search ............ 60/286, 60/295, 301, 303
See application file for complete search history.

(56) References Cited

U.S. PATENT DOCUMENTS

| | | | | |
|---|---|---|---|---|
| 4,222,435 A | * | 9/1980 | Kumagai | 165/11.1 |
| 6,122,909 A | * | 9/2000 | Murphy et al. | 60/286 |
| 6,266,955 B1 | * | 7/2001 | Liang et al. | 60/274 |
| 6,269,634 B1 | * | 8/2001 | Yokota et al. | 60/286 |
| 6,301,879 B1 | * | 10/2001 | Weisweiler et al. | 60/274 |
| 2007/0079599 A1 | | 4/2007 | Osaku et al. | |
| 2007/0090650 A1 | | 4/2007 | Komlyama et al. | |

FOREIGN PATENT DOCUMENTS

| | | |
|---|---|---|
| EP | 1 662 103 A1 | 5/2006 |
| EP | 1 775 392 A2 | 4/2007 |
| JP | 62-21159 U | 2/1987 |
| JP | 2002327461 A * | 11/2002 |
| JP | 2003-20936 A | 1/2003 |
| JP | 3649147 B2 | 2/2005 |
| JP | 2005-83223 A | 3/2005 |
| JP | 2007-107230 A | 4/2007 |

OTHER PUBLICATIONS

JP 2002/327461 A Machine Translation.* International Search Report dated Sep. 2, 2008 with English translation (four (4) pages).

* cited by examiner

Primary Examiner — Kenneth Bomberg
Assistant Examiner — Brandon Lee
(74) Attorney, Agent, or Firm — Crowell & Moring LLP

(57) ABSTRACT

A construction machine includes a front working implement operable as a result of driving of an engine, a urea SCR catalyst arranged in an exhaust gas line from the engine to purify and reduce nitrogen oxides in exhaust gas, an aqueous urea solution tank for storing an aqueous urea solution, a temperature detector for detecting a temperature of the aqueous urea solution, an air conditioner for air-conditioning an operator's cab, and a warm/cold air guiding device for guiding warm/cold air, which has been blown out of the air conditioner, to the aqueous urea solution tank in accordance with the temperature of the aqueous urea solution. The warm/cold air guiding device includes a controller for outputting a warm air control signal or cold air control signal, which corresponds to a temperature of the warm/cold air blown out of the air conditioner.

6 Claims, 3 Drawing Sheets

CONSTRUCTION MACHINE

TECHNICAL FIELD

This invention relates to a construction machine such as hydraulic excavator, which has a reducing agent tank in which a reducing agent to be fed to an exhaust gas line from an engine is stored.

BACKGROUND ART

As a conventional technology of this sort, there is the technology described in JP-A-2005-83223. This conventional technology features that in a moving vehicle equipped with an engine, a reducing agent, for example, an aqueous solution of urea or the like which readily gives off ammonia is injected and fed from a reducing agent tank, in which the reducing agent is stored, into an exhaust system of the engine to lower the concentration of nitrogen oxides NOx in exhaust gas. This patent document discloses a construction provided with a temperature detector for detecting a temperature of the aqueous solution of urea stored in the reducing agent tank, that is, an aqueous urea solution tank; an additional coolant recirculation passage branched out from a coolant recirculation passage for the engine and communicating into the aqueous urea solution tank; two three-way cocks, a coolant recirculation pump and a solenoid valve, all of which are arranged on the additional coolant recirculation passage; and a heat exchanger arranged in the aqueous urea solution tank.

When the temperature of the aqueous urea solution in the aqueous urea solution tank becomes high, a possibility may arise that ammonia may be given off. When the temperature of the aqueous urea solution conversely becomes low, another possibility may arise that freezing may take place to pose a problem for injecting and feeding the aqueous urea solution into the exhaust system of the engine. With the foregoing in view, the conventional technology constituted as mentioned above is designed such that, when the temperature of the aqueous urea solution in the aqueous urea solution tank as detected by the temperature detector has risen beyond a predetermined temperature range to such a high temperature as possibly giving off ammonia, coolant for the engine is guided into the above-mentioned additional coolant recirculation passage to lower the temperature of the aqueous urea solution by means of the heat exchanger in the aqueous urea solution tank and, when the temperature inside the aqueous urea solution tank is conversely lower than the predetermined temperature range and is at such a temperature as possibly causing freezing, the coolant for the engine is guided into the above-mentioned additional coolant recirculation passage to raise the temperature of the aqueous urea solution by means of the heat exchanger in the aqueous urea solution tank. In this manner, the temperature of the aqueous urea solution in the aqueous urea solution tank is maintained at a temperature within the predetermined temperature range that causes neither giving-off of ammonia nor a freezing-related problem.

DISCLOSURE OF THE INVENTION

Problem to be Solved by the Invention

To maintain the temperature of the reducing agent in the reducing agent tank, that is, the aqueous urea solution in the aqueous urea solution tank at a temperature within the predetermined temperature range, the above-mentioned conventional technology requires the two three-way cocks, the coolant recirculation pump, the solenoid valve, the heat exchanger arranged in the reducing agent tank, and the like. Therefore, the conventional technology requires many components, and tends to result in a complex structure and higher manufacturing cost. Because of the greater number of components, large installation space corresponding to these components is needed. In a construction machine prone to restriction by installation space, the installation of these components tends to become difficult. Moreover, the heat exchanger is arranged in the reducing agent tank, and therefore, cumbersome maintenance work is needed for the heat exchanger and the maintenance cost tends to become high.

With the above-mentioned circumstances of the conventional technology in view, the present invention has as an object thereof the provision of a construction machine capable of realizing with fewer components the temperature control of a reducing agent in a reducing agent tank without arranging a heat exchanger in the reducing agent tank.

Means for Solving the Problem

To achieve this object, the present invention is characterized in that, in a construction machine provided with an engine, a working implement operable as a result of driving of the engine, a reduction catalyst arranged in an exhaust gas line from the engine to purify and reduce nitrogen oxides in exhaust gas, a reducing agent tank in which a reducing agent to be fed to the exhaust gas line is stored, and a temperature detector for detecting a temperature of the reducing agent in the reducing agent tank, the construction machine is provided with an air conditioner for air-conditioning an operator's cab, and a warm/cold air guiding system for guiding warm/cold air, which has been blown out of the air conditioner, to the reducing agent tank in accordance with the temperature of the reducing agent as detected by the temperature detector.

According to the present invention constituted as described above, when the temperature of the reducing agent in the reducing agent tank is detected by the temperature detector to have risen to a high temperature beyond the predetermined temperature range, the warm/cold air guiding system is operated to guide cold air, which has been blown out of the air conditioner, to the reducing agent tank and to cool the reducing agent tank. As a consequence, the temperature of the reducing agent in the reducing agent tank can be lowered such that it reaches a temperature within the predetermined temperature range. When the temperature of the reducing agent in the reducing agent tank is detected by the temperature detector to have conversely dropped to a temperature lower than the predetermined temperature range, the warm/cold air guiding system is also operated to guide warm air, which has been blown out of the air conditioner, to the reducing agent tank and to warm the reducing agent tank. As a consequence, the temperature of the reducing agent in the reducing agent tank can be raised such that it reaches a temperature within the predetermined temperature range.

In the construction machine provided with the air conditioner for air-conditioning the operator's cab, the present invention can realize the temperature control to maintain the temperature of the reducing agent in the reducing agent tank at a temperature within the predetermined temperature range by guiding warm/cold air, which has been blown out of the air conditioner, to the reducing agent tank by means of the temperature detector, which serves to detect the temperature of the reducing agent in the reducing agent tank, and the warm/cold air guiding system as described above. As the warm/cold air guiding system, it is only necessary to arrange a processor for performing processing to blow cold air or warm air out of the air conditioner in association with the temperature detected by the temperature detector, for example, a controller and an air blow line composed of a duct or the like for guiding the cold air or warm air from the air conditioner to the reducing agent tank. It is, therefore, possible to realize the temperature control of the reducing agent in the reducing agent tank with fewer components. As this temperature control of the reducing agent can be conducted by blowing cold air or warm air from the air conditioner against the reducing agent tank, it is possible to realize the temperature control of the reducing agent without arranging any heat exchanger in the reducing agent tank.

The present invention is also characterized in that in the above-described invention, the warm/cold air guiding system may comprise a controller for outputting a warm air signal or cold air signal, which corresponds to the temperature of the warm/cold air blown out of the air conditioner in accordance with the temperature of the reducing agent as detected by the temperature detector, as a control signal for the air conditioner, and an air blow line for guiding the warm/cold air from the air conditioner to the reducing agent tank, and the controller may output the cold air signal when the temperature of the reducing agent is equal to or higher than a first predetermined temperature, or may output the warm air signal when the temperature of the reducing agent is equal to or lower than a second predetermined temperature which is lower than the first predetermined temperature.

According to the present invention constituted as described above, the first predetermined temperature may beset in a high temperature range at such a high temperature as giving off no ammonia from the reducing agent tank, and the second predetermined temperature may be set in a low temperature range at such a low temperature as causing no freezing of the reducing agent in the reducing agent tank. In this manner, the temperature of the reducing agent in the reducing agent tank can be surely maintained at a temperature, which is within the predetermined temperature range and is higher than the second predetermined temperature but lower than the first predetermined temperature.

The present invention is also characterized in that in the above-described invention, the construction machine may be further provided with a control device arranged in the operator's cab for controlling the air conditioner, and a switching device, upon operation of the control device, for switching a flow of the warm/cold air blown out of the air conditioner such that a portion of the warm/cold air from the air conditioner is fed into the operator's cab.

According to the present invention constituted as described above, warm/cold air is guided from the air conditioner to the reducing agent tank via the warm/cold air guiding system when the control device in the operator's cab is operated. Even in a state that the reducing agent tank is cooled or warmed, a portion of the warm/cold air can hence be fed to the operator's cab via the switching device to air-condition the operator's cab.

The present invention is also characterized in that in the above-described invention, the construction machine may be further provided with a compartment accommodating the reducing agent tank therein and composed of a partition cover.

According to the present invention constituted as described above, even when the reducing agent spills out of the reducing agent tank, for example, upon replenishing the reducing agent into the reducing agent tank, the spilt reducing agent is blocked by the partition cover that forms the compartment, and does not leak out of the compartment. Therefore, the reducing agent is prevented from coming into contact with equipment or the like arranged outside the compartment, thereby making it possible to protect the equipment or the like from corrosion by the reducing agent.

The present invention is also characterized in that in the above-described invention, the reducing agent tank may be arranged adjacent the operator's cab.

According to the present invention constituted as described above, the distance between the air conditioner and the reducing agent tank can be set relatively short so that upon embodying the warm/cold air guiding system, an air line such as a duct for guiding warm/cold air from the air conditioner to the reducing agent tank can be constructed in a small size.

Advantageous Effects of the Invention

The present invention is of such a simple construction as being provided merely with the air conditioner for air-conditioning the operator's cab and the warm/cold air guiding system for guiding warm/cold air, which has been blown out of the air conditioner, to the reducing agent tank. It is, therefore, possible to realize with fewer components the temperature control of the reducing agent in the reducing agent tank. As a consequence, the construction can be formed simpler and at lower manufacturing cost compared with the conventional technology. Owing to the reduction in the number of components, smaller installation space is needed for the temperature control of the reducing agent in the reducing agent tank compared with the conventional technology. The present invention is, therefore, also suited for construction machines prone to restriction by installation space. Further, it is unnecessary to arrange a heat exchanger in the reducing agent tank. As a result, cumbersome maintenance work for such a heat exchanger, which has heretofore been needed, can be obviated, thereby making it possible to lower the maintenance cost compared with the conventional technology.

BEST MODE FOR CARRYING OUT THE INVENTION

The present invention will hereinafter be described based on a best mode for carrying out the construction machine according to the present invention.

Figure 1:
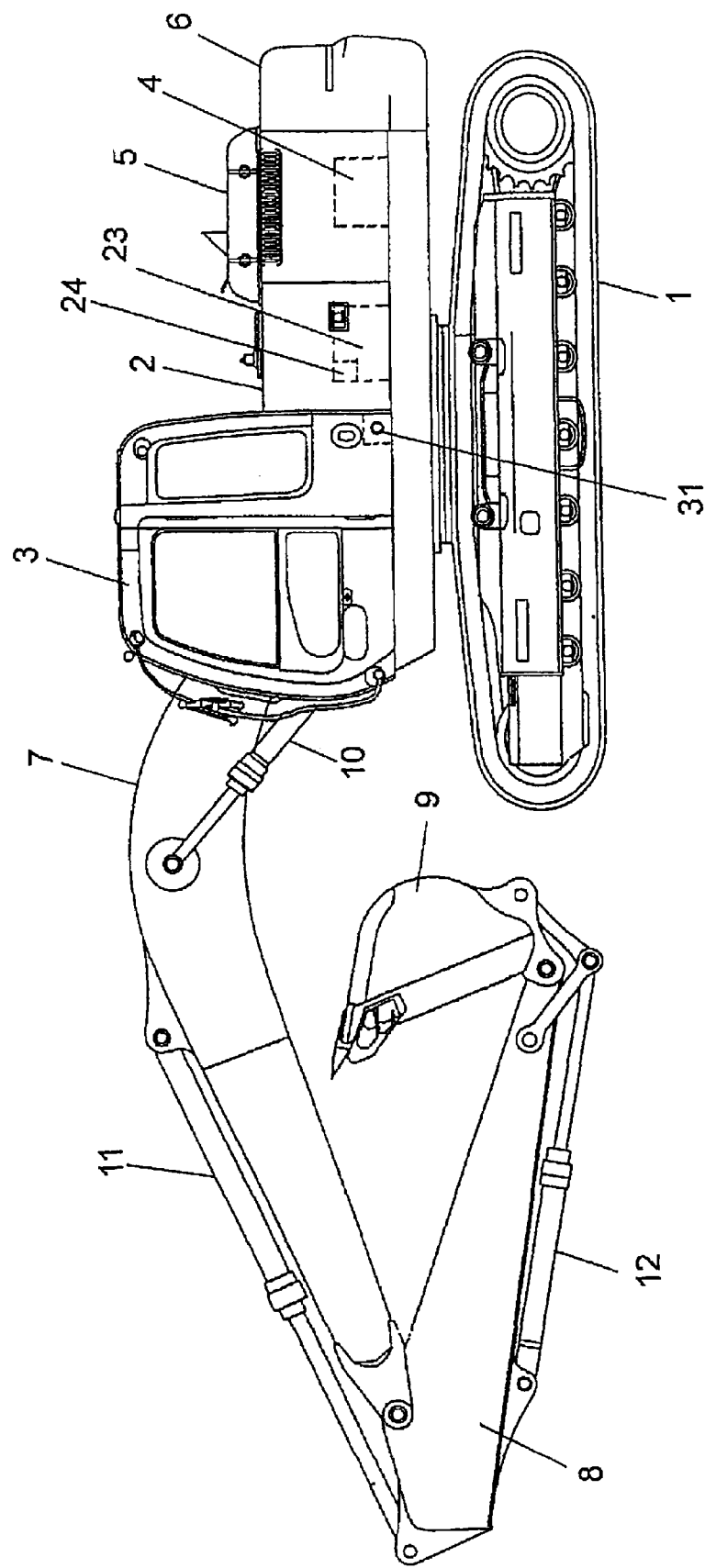
FIG. 1 is a side view showing one embodiment of the construction machine according to the present invention.
Figure 2:
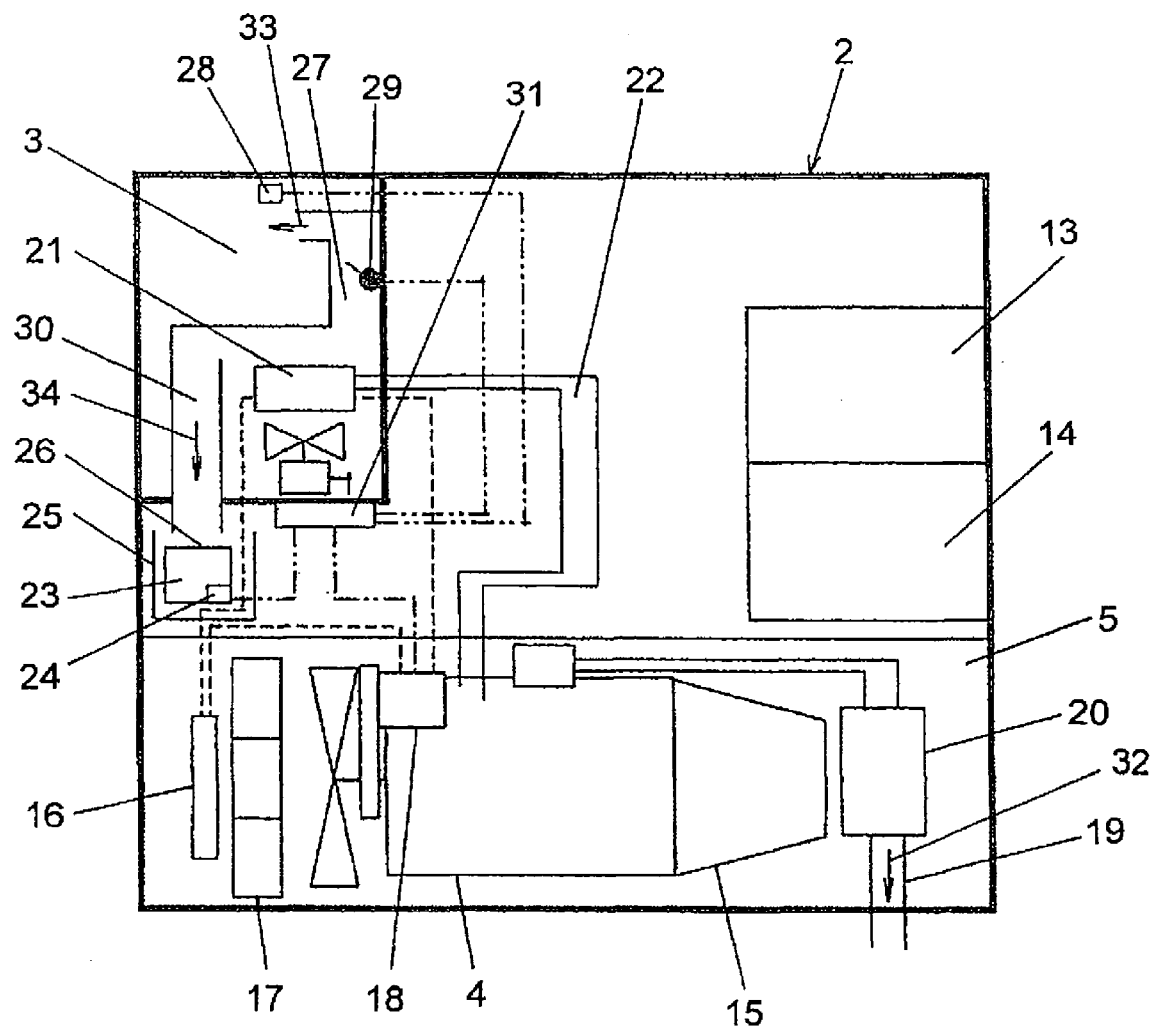
FIG. 2 is a plan view depicting an essential section of a revolving upperstructure arranged in the embodiment.
Figure 3:
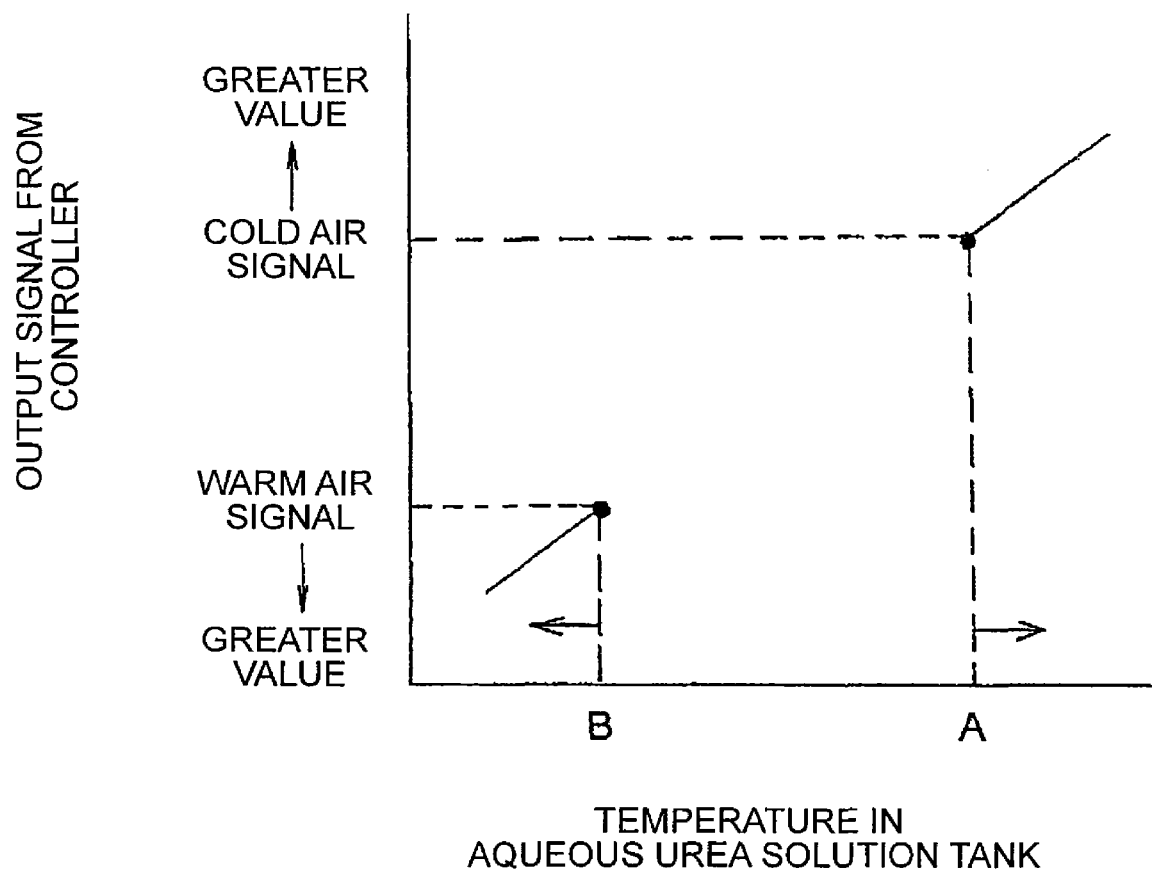
FIG. 3 is a diagram illustrating relationship between temperatures in an aqueous urea solution tank as stored in a controller arranged in the embodiment and output signals from the controller.

FIG. 1 is a side view showing one embodiment of the construction machine according to the present invention, FIG. 2 is a plan view depicting an essential section of a revolving upperstructure arranged in the embodiment, and FIG. 3 is a diagram illustrating a relationship in a controller arranged in the embodiment, between temperatures in an aqueous urea solution tank, as stored, and output signals from the controller.

As shown in FIG. 1 by way of example, this embodiment is a hydraulic excavator and is provided with a travel base 1 and a revolving upperstructure 2 disposed on the travel base 1. An operator's cab 3 is arranged on the revolving upperstructure 2 at a forward position thereof. At a position rear of the operator's cab 3, an engine compartment 5 is arranged with an engine 4 accommodated therein, and on a rearmost end portion, a counterweight 6 for ensuring weight balancing is arranged. This embodiment is also provided with a boom 7 mounted pivotally in an up-and-down direction on the revolving upperstructure 2, an arm 8 secured pivotally in an up-and-down direction on a free end of the boom 7, and a bucket 9 attached pivotally in an up-and-down direction on a free end of the arm 8. This embodiment is also provided with actuators such as a boom cylinder 10 for operating the boom 7, an arm cylinder 11 for operating the arm 8, and a bucket cylinder 12 for operating the bucket 9. It is to be noted that a front working implement, which can perform digging work and the like, is constructed by these boom 7, arm 8, bucket 9, boom cylinder 10, arm cylinder 11 and bucket cylinder 12.

As depicted in FIG. 2, a fuel tank 13 and hydraulic oil reservoir 14 are arranged on the revolving upperstructure 2 at positions in lateral directions from the operator's cab 3. Arranged within the engine compartment 5 is a hydraulic pump 15, which is driven by the engine 4 and delivers pressure oil to operate the actuators that make up the above-mentioned front working implement. Disposed on an upstream side of the engine 4 are a condenser 16 for cooling coolant, which has been compressed by a compressor mounted on the engine 4, and a heat exchanger unit 17 such as a radiator. In an exhaust gas line 19, a reduction catalyst for decreasing nitrogen oxides NOx in exhaust gas, for example, a urea SCR catalyst 20 is arranged.

In the operator's cab 3, an air conditioner 21 for air-conditioning the operator's cab 3 is arranged. It is designed that warm/cold air from the air conditioner 21 is guided into the operator's cab 3 by a first air blow line 27 composed of a duct or the like. Further, the engine 4 and the air conditioner 21 are connected with each other via a coolant line 22 which guides the engine coolant.

A compartment 26 within which a reducing agent tank, for example, an aqueous urea solution tank 23 is accommodated is arranged such that the compartment 26 is located, for example, adjacent the operator's cab 3. This compartment 26 is composed of a partition cover 25 formed to surround the aqueous urea solution tank 23. Arranged in the aqueous urea solution tank 23 is a temperature detector 24 for detecting a temperature of a reducing agent, specifically the aqueous urea solution stored in the aqueous urea solution tank 23.

In particular, this embodiment is provided with a warm/cold air guiding system for guiding warm/cold air, which has been blown out of the air conditioner 21 in accordance with the temperature of the aqueous urea solution as detected by the temperature detector 24, to the aqueous urea solution tank 23. This warm/cold air guiding system is composed, for example, of a controller 31 and a second air blow line 30. The controller 31 outputs, as a control signal for the air conditioner 21, a warm air signal or cold air signal, which corresponds to the temperature of the warm/cold air blown out of the air conditioner 21 in accordance with the temperature of the aqueous urea solution as detected by the temperature detector 24. The second air blow line 30 is composed of a duct or the like, and guides the warm/cold air from the air conditioner 21 to the aqueous urea solution tank 23.

Stored in the above-mentioned controller 31 is, for example, the relationship between the temperatures in the aqueous urea solution tank 23 and the output signals from the controller 31 as illustrated in FIG. 3. Specifically, there is stored a relationship that, when the temperature in the aqueous urea solution tank 23 as detected by the temperature detector 24 is in a high temperature range and such a high temperature as giving off no ammonia from the aqueous urea solution tank 23, for example, a first predetermined temperature A of 40° C. or so, a cold air signal having a value which gradually lowers the temperature of air to be blown is selected in accordance with the temperature rise and that, when the temperature in the aqueous urea solution tank 23 as detected by the temperature detector 24 is in a low temperature range and is such a low temperature as causing no freezing of the aqueous urea solution tank 23, for example, a second predetermined temperature of −10° C. or so, a warm air signal having a value which gradually raises the temperature of air to be blown is selected in accordance with the temperature drop.

For example, the first air blow line 27 and the second air blow line 30 are communicated with each other. Arranged in the first air blow line 27 is a mechanism for communicating or cutting off the first air blow line 27 in response to the signal outputted from the controller 31, for example, an on/off valve 29. Further, a control device 28 is arranged in the operator's cab 3 to operate the air conditioner 21.

The above-mentioned first air blow line 27, on/off valve 29 and controller 31 make up a switching device, which upon operation of the control device 28, switches a flow of warm/cold air blown out of the air conditioner 21 such that a portion of the warm/cold air from the air conditioner 21 is fed into the operator's cab 3 even during operation of the above-mentioned warm/cold air guiding system.

In this embodiment constituted as described above, when pressure oil is fed as a result of driving of the engine 4 from the hydraulic pump 15 to, for example, actuators that make up the front working implement, the boom 7, arm 8 and/or bucket 9 are selectively operated to perform digging work or the like.

When exhaust gas is guided from the engine 4 to the exhaust gas line 19 and the aqueous urea solution is fed by an unillustrated injector from the aqueous urea solution tank 23, in which the aqueous urea solution is stored, to the exhaust gas line 19, nitrogen oxides NOx in the exhaust gas are reduced and purified by the urea SCR catalyst 20, and exhaust gas of lowered NOx concentration is emitted to the outside as indicated by an arrow 32 in FIG. 2.

When the temperature in the temperature detector 23, namely, the temperature of the aqueous urea solution is at a temperature higher than the second predetermined temperature B but lower than the first predetermined temperature A within a predetermined temperature range shown in FIG. 3, the controller 31 is maintained, for example, to output neither a cold air signal nor a warm air signal. When maintained in such a state, the air conditioner 21 is maintained in a stopped state as long as the control device 28 in the operator's cab 3 is not operated.

When the control device 28 is operated in a state that the temperature of the aqueous urea solution is maintained at a temperature within the predetermined temperature range as described above, a signal is outputted from the controller 31 to the air conditioner 21 to operate the air conditioner 21, and at the same time, a signal is also outputted from the controller 31 to change the on/off valve 29 in the first air blow line 27. As a result, cold air or warm air is fed from the air conditioner 21 into the operator's cab 3 via the first air blow line 27 as indicated by an arrow 33, so that air-conditioning of the operator's cab 3 is conducted. It is to be noted that at this time, cold air or warm air is also blown from the air conditioner 21 against the aqueous urea solution tank 23, for example, via the second air blow line 30 as indicated by an arrow 34. Accordingly, although the aqueous urea solution in the aqueous urea solution tank 23 is maintained at the temperature within the predetermined temperature range, the aqueous urea solution is maintained in a state that it is cooled or warmed by the cold air or warm air from the air conditioner 21. When the operation of the control device 28 is stopped, a signal is outputted from the controller 31 to close the on/off valve 29. As a result, the on/off valve 29 is switched into a closed state in which the first air blow line 27 is cut off.

When the temperature of the aqueous urea solution in the aqueous urea solution tank 23 as detected by the temperature detector 24 has risen to the first predetermined temperature A or higher in FIG. 3, for example, in a state that the control device 28 has not been operated and the first air blow line 27 is cut off by the on/off valve 29, a cold air signal is outputted from the controller 31 to the air conditioner 21. As a result, cold air of a temperature corresponding to the cold air signal is blown out of the air conditioner 21. This cold air is blown against the aqueous urea solution tank 23 via the second air blow line 30 as indicated by the arrow 34. As a consequence, the aqueous urea solution tank 23 is cooled, so that the temperature of the aqueous urea solution in the aqueous urea solution tank 23 drops. When the temperature of the aqueous urea solution as detected by the temperature detector 24 drops to a temperature which is lower than the first predetermined temperature A but is still within the predetermined temperature range, a control signal is outputted from the controller 31 to the air conditioner 21 to stop the operation of the air conditioner 21. As a result, the air conditioner 21 is stopped, and the blow-out of cold air from the air conditioner 21 is stopped. By the operations as described above, it is possible to inhibit ammonia from being given off from the aqueous urea solution tank 23.

When the temperature of the aqueous urea solution in the aqueous urea solution tank 23 as detected by the temperature detector 24 has dropped to the first predetermined temperature B or lower in FIG. 3 in contrast to the above-mentioned situation, for example, in a state that the control device 28 has not been operated and the first air blow line 27 is cut off by the on/off valve 29, a warm air signal is outputted from the controller 31 to the air conditioner 21. As a result, the air conditioner 21 is operated, and warm air of a temperature corresponding to the warm air signal is blown out of the air conditioner 21. This warm air is blown against the aqueous urea solution tank 23 via the second air blow line 30 as indicated by the arrow 34. As a result, the aqueous urea solution tank 23 is warmed so that the temperature of the aqueous urea solution in the aqueous urea solution tank 23 rises. When the temperature detected by the temperature detector 24 has risen to a temperature which is higher than the second predetermined temperature B and is still within the predetermined temperature range, a control signal is outputted from the controller 31 to the air conditioner 21 to stop the operation of the air conditioner 21. As a result, the air conditioner 21 is stopped and the blow-out of hot air from the air conditioner 21 is stopped. By the operations as described above, it is possible to inhibit freezing of the aqueous urea solution in the aqueous urea solution tank 23.

Upon operation of the control device 28 when the temperature of the aqueous urea solution as detected by the temperature detector 24 is higher than the first predetermined temperature A, for example, at hot time of high surrounding temperature and cold air is blown from the air conditioner 21 against the aqueous urea solution tank 23 in response to a cold air signal from the controller 31, a signal is outputted from the controller 31 to operate the on/off valve 29. As a result, the on/off valve 29 is opened so that a portion of cold air blown out of the air conditioner 21 is fed to the operator's cab 3 via the first air blow line 27 as indicated by the arrow 33. Therefore, the aqueous urea solution tank 23 is cooled, and the interior of the operator's cab 3 is also cooled.

Upon operation of the control device 28 when the temperature of the aqueous urea solution as detected by the temperature detector 24 is lower than the second predetermined temperature B, for example, at cold time of extremely low surrounding temperature and air is blown from the air conditioner 21 against the aqueous urea solution tank 23 in response to a warm air signal from the controller 31, a signal is outputted from the controller 31 to operate the on/off valve 29. As a result, the on/off valve 29 is opened so that a portion of warm air blown out of the air conditioner 21 is also fed to the operator's cab 3 via the first air blow line 27 as indicated by the arrow 33. Therefore, the aqueous urea solution tank 23 is warmed, and the interior of the operator's cab 3 is also warmed.

According to this embodiment constituted as described above, when the temperature of the aqueous urea solution in the aqueous urea solution tank 23 is detected by the temperature detector 24 to have risen to a high temperature beyond temperatures in the predetermined temperature range as mentioned above, cold air blown out of the air conditioner 21 is guided to the aqueous urea solution tank 23 via the second air blow line 30 to cool the aqueous urea solution tank 23. As a result, the temperature of the aqueous urea solution in the aqueous urea solution tank 23 can be controlled to a temperature within the predetermined temperature range. When the temperature of the aqueous urea solution in the aqueous urea solution tank 23 is detected by the temperature detector 24 to have conversely dropped to a temperature lower than temperatures in the predetermined temperature range, warm air blown out of the air conditioner 21 is also guided to the aqueous urea solution tank 23 to warm the aqueous urea solution tank 23. As a result, the temperature of the aqueous urea solution in the aqueous urea solution tank 23 can be controlled to a temperature within the predetermined temperature range. As a consequence, it is possible to inhibit giving-off of ammonia from the aqueous urea solution tank 23 and freezing of the aqueous urea solution. Therefore, it is possible to prevent damage which would otherwise be caused by ammonia and also to realize excellent exhaust gas treatment.

In particular, this embodiment can realize the temperature control of the aqueous urea solution in the aqueous urea solution tank 23 by such fewer components as simply arranging the controller 31 and second air blow line 30, specifically as simply arranging the second air flow line 30, which is composed of a duct or the like, in addition to the controller 31 which is provided in general. Therefore, this embodiment is simple in structure and can reduce the manufacturing cost. As the number of components can be reduced, this embodiment requires smaller installation space, and therefore, can be arranged in a small hydraulic excavator or the like which is prone to restriction by installation space. In addition, the temperature control of the aqueous urea solution can be realized without arranging any heat exchanger in the aqueous urea solution tank 23, thereby making it possible to obviate cumbersome maintenance work for such a heat exchanger and to reduce the maintenance cost.

Further, owing to the arrangement of the on/off valve 29 that opens or closes the first air blow line 27 in response to a signal outputted from the controller 31 as a result of an operation of the control device 28, air-conditioning of the operator's cab 3 can be realized by operating the control device 28 even in the state that the air conditioner 21 is operated and warm or cold air is blown against the aqueous urea solution tank 23. No problem, therefore, arises in the air-conditioning of the interior of the operator's cab 3.

Further, the aqueous urea solution tank 23 is accommodated within the compartment 26 surrounded by the partition cover 25. Even when the aqueous urea solution spills out of the aqueous urea solution tank 23, for example, upon replenishment of the aqueous urea solution into the aqueous urea solution tank 23, the spilt aqueous urea solution is, therefore, blocked by the partition cover 25 that forms the compartment 26, and does not leak out of the compartment 26. Therefore, the aqueous urea solution is prevented from coming into contact with equipment or the like arranged outside the compartment 26, thereby making it possible to protect the equipment or the like outside the compartment 26 from corrosion by the aqueous urea solution.

As the aqueous urea solution tank 23 is arranged adjacent the operator's cab 3, the distance between the air conditioner 21, which is arranged in the operator's cab 3, and the aqueous urea solution tank 23 can be set relatively short. Therefore, the second air blow line 30 composed of a duct of the like can be constructed small in size.

It is to be noted that, although the above-described embodiment is provided with the aqueous urea solution as a reducing agent, such a reducing agent may be aqueous ammonia.

LEGEND

2 Revolving upperstructure
3 Operator's cab
4 Engine
5 Engine compartment
7 Boom
8 Arm
9 Bucket
10 Boom cylinder
11 Arm cylinder
12 Bucket cylinder
19 Exhaust gas line
20 Urea SCR catalyst (reduction catalyst)
21 Air conditioner
23 Aqueous urea solution tank (reducing agent tank)
24 Temperature detector
25 Partition cover
26 Compartment
27 First air blow line
28 Control device
29 On/off device
30 Second air blow line
31 Controller

The invention claimed is:

1. A construction machine, comprising:
an engine;
a working implement operable as a result of driving of the engine;
a reduction catalyst arranged in an exhaust gas line from the engine to purify and reduce nitrogen oxides in exhaust gas;
a reducing agent tank in which a reducing agent to be fed to the exhaust gas line is stored;
a temperature detector operatively arranged to detect a temperature of the reducing agent in the reducing agent tank;
an air conditioner providing an air condition in an operator's cab;
a control device operatively arranged in the operator's cab to control the air condition;
a first air blow line operatively arranged to guide warm/cold air from the air conditioner to the operator's cab;
a switching device operatively arranged to switch a flow of the warm/cold air blown out of the air conditioner such that a portion of the warm/cold air from the air conditioner is fed into the operator's cab through the first air blow line; and
a warm/cold air guide system comprising: a second air blow line operatively arranged to guide the warm/cold air from the air conditioner to the reducing agent tank; and
a electronic controller having operative logic that outputs a warm air signal or a cold air signal, which corresponds to a temperature of the warm/cold air blown out of the air conditioner in accordance with the temperature of the reducing agent as detected by the temperature detector, as a control signal for the air conditioner; the operative logic of the controller being configured to;
(a) in a state where the control device is not operating, the controller outputs the cold air signal when the temperature of the reducing agent is higher than a first predetermined temperature or outputs the warm air signal when the temperature of the reducing agent is lower than a second predetermined temperature which is lower than the first predetermined temperature, to guide the warm/cold air blown out of the air conditioner to the reducing agent tank through the second air blow line;
(b) while in a state where the control device is not operating, the controller outputs a stop signal when the temperature of the reducing agent is higher than the second predetermined temperature but is lower than the first predetermined temperature; and
(c) upon operating the control device, the controller outputs a control signal for the air-conditioner and controls the switching device such that a portion of the warm/cold air blown out of the air conditioner is fed to the first air blow line when the temperature of the reducing agent is within a range of the predetermined temperature.

2. The construction machine according to claim 1, wherein the controller controls the switching device such that a portion of the warm/cold air blown out of the air conditioner is fed to the first air blow line upon the operation of the control device, when the temperature of the reducing agent is higher than the first predetermined temperature such that the cold air signal is output and cold air blown out of the air conditioner is fed to the reducing agent tank through the second air blow line or when the temperature of the reducing agent is lower than the second predetermined temperature, which is lower than the first predetermined temperature, such that the warm air signal is output and the warm air blown out of the air conditioner is fed to the reducing agent tank through the second air blow line.

3. The construction machine according to claim 1, further comprising:
a compartment accommodating the reducing agent tank therein and composed of a partition cover.

4. The construction machine according to claim 2, further comprising:
a compartment accommodating the reducing agent tank therein and composed of a partition cover.

5. The construction machine according to claim 1, wherein the reducing agent tank is arranged adjacent the operator's cab.

6. The construction machine according to claim 2, wherein the reducing agent tank is arranged adjacent the operator's cab.

* * * * *